United States Patent

[11] 3,604,717

| [72] | Inventor | George Hohwart<br>Howell, Mich. |
|---|---|---|
| [21] | Appl. No. | 884,959 |
| [22] | Filed | Dec. 15, 1969 |
| [45] | Patented | Sept. 14, 1971 |
| [73] | Assignee | N. A. Woodworth Company<br>Ferndale, Mich. |

[54] PINCH CHUCK
16 Claims, 9 Drawing Figs.

[52] U.S. Cl. .................................................. 279/1 DA,
269/267, 279/1 J, 279/1 L, 279/106
[51] Int. Cl. ...................................................... B23b 31/10
[50] Field of Search ............................................ 279/1 DC, 1
DA, 1 J, 1 L, 35, 37, 66, 74, 106, 119, 121; 77/18;
269/267, 266

[56] References Cited
UNITED STATES PATENTS

| 2,698,185 | 12/1954 | Sloan ............................ | 279/1 |
| 2,703,242 | 3/1955 | Sloan et al. .................... | 279/1 |
| 2,736,563 | 2/1956 | Work ............................. | 279/1 |
| 3,069,181 | 12/1962 | Hohwart et al. ................ | 279/106 |

Primary Examiner—Donald R. Schran
Assistant Examiner—James F. Coan
Attorney—Harness, Dickey & Pierce ABSTRACT: A chuck provided with two sets of opposed work holding jaws having axially oppositely angularly inclined rocker arm portions pivotable in swivel mountings to clamp and release the jaws, and means for pivotally actuating the arm portions of the jaws including a reciprocable actuator, two sets of longitudinally shiftable actuator bars—one for each set of jaws—carried by the actuator, and circumferentially adjustable wedge members also carried by the actuator at the ends of the bars, each actuator bar being associated with a respective work holding jaw and operatively connected to the rocker arm portion thereof so that movement of the actuator in one direction pivots the two sets of rocker arms in opposite directions to move the two sets of jaws in opposition to each other to engage the workpiece with a pinch action, the connecting means and particularly the actuator bars and the wedge members operating, shifting and adjusting automatically under clamping pressure to centralize the surface of the workpiece engaged by one set of jaws in the chuck, to compensate for eccentricity or out-of-roundness of the surface engaged by the other set of jaws, and to equalize or otherwise selectively distribute clamping pressure among the jaws.

INVENTOR.
George Hohwart
BY Harness, Dickey & Pierce
ATTORNEYS

PINCH CHUCK

BACKGROUND OF THE INVENTION

This invention is a further development in and an improvement on work holding chucks of the type disclosed in U.S. Pat. No. 3,365,206 which issued Jan. 23, 1968. In the patented chuck, the rocker arm portions of the work holding jaws are pivotally actuated in swivel mountings through radially shiftable and adjustable segmental members which interconnect a reciprocable actuator and slidable rear swivels on the rocker arms. The segments adjust individually under clamping pressure as required to equalize the holding force exerted on the work by all of the jaws. However, a relatively large diameter body is required to house the radially shiftable, pressure compensating segments and the other operating parts of the chuck, and all machines on which the chuck might otherwise be used are not capable of handling a chuck of this size. Also, it is not possible using the prior art construction to make one set of jaws centralizing in its action and the other set compensating.

SUMMARY OF THE INVENTION

The present invention eliminates the radially adjustable segments heretofore required and substitutes a much more compact arrangement for translating the reciprocatory motion of the actuator into radial clamping and unclamping movement of the rocker arms and jaws. The compactness of the chuck permits it to be used in a wider range of environmental situations and on machines in which the chuck must have a limited swing and comparatively low height. In addition, the novel motion-transmitting mechanism of this invention is more versatile than the previous mechanism in that it can be adapted to clamp the workpiece first with one set of jaws centered precisely with respect to the rotational axis of the chuck and then to clamp the workpiece with a second set of jaws which may be either centralizing or compensating. Also, the two sets of jaws can be made to work in opposition to each other so that, if desired, they clamp the workpiece with a pinch action. Further, all of the jaws can be made to engage the work with the same or substantially the same holding force; or, by a relatively simple modification, the two sets of jaws can be made to clamp the workpiece with different holding forces. Also, the chuck of this invention can be easily modified so that both sets of jaws clamp the workpiece either internally or externally; and, in any or all of these forms the jaws can be arranged all in the same radial plane or with one set of jaws spaced axially from the other. The advantages and the versatility in use afforded by the chuck of this invention is obvious.

DESCRIPTION OF THE PREFERRED EMBODIMENT

Figures 1, 2, 3:
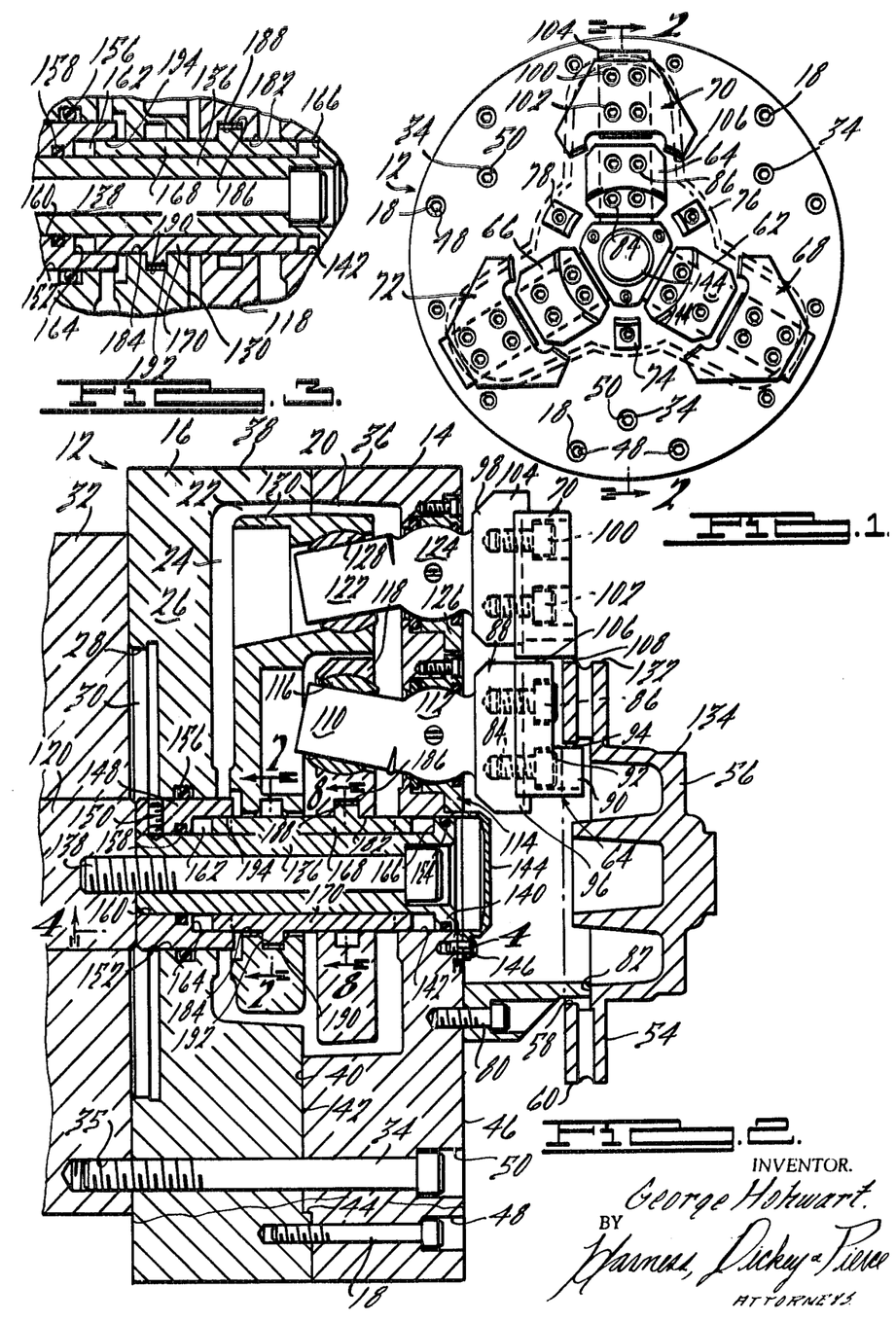
FIG. 1 is a face or plan view of a chuck embodying the present invention.
FIG. 2 is an enlarged, diametrical sectional view taken on the line 2—2 of FIG. 1.
FIG. 3 is an enlarged view of the central actuator portion of the chuck and showing a modified form of jaw actuator.
Figure 4:
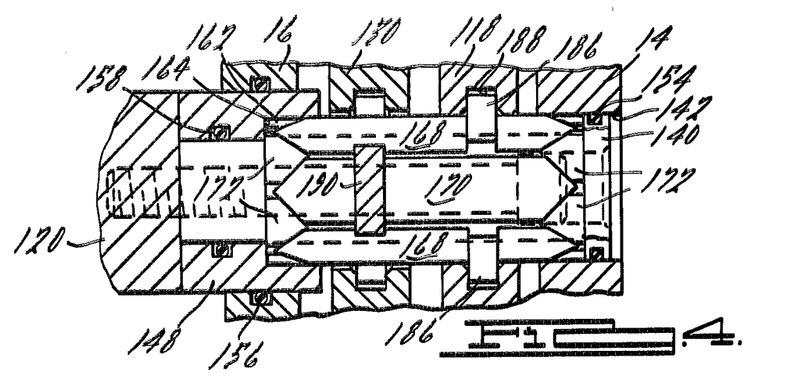
FIG. 4 is a fragmentary, longitudinal sectional view taken on the line 4—4 of FIG. 2.

Reference is first had to FIGS. 1 and 2 which show a chuck embodying the present invention having a body 12 which consists of front and rear generally disc shaped body portions 14 and 16 fastened securely together by an annular series of screws 18. Confronting, complementary cavities 20 and 22 in the two body portions 14 and 16 define an internal chamber 24 which is adapted to contain and house the operating parts of the chuck. As shown in FIG. 2, the bottom 26 of the rear body portion 16 is relatively thick and is formed at the outer or rearward side and centrally thereof with a socket 28 which is adapted to fit over and to snugly receive an end embossment or pilot 30 on a machine spindle 32. Only a fragmentary end portion of the spindle 32 is here shown, but it will be appreciated that the spindle and the pilot 30 are conventional machine parts. Machine spindles of the type shown are mounted for rotation in suitable housings (not shown) and are rotatably driven in any suitable or conventional manner. The forward end of the spindle 32 projects from the housing and the chuck body 12 is designed to be mounted on the end of the spindle, as shown. The pilot 30 holds the chuck body 12 centered properly with respect to the rotational axis of the spindle 32 and it also holds the body against lateral or radial movement on and relative to the spindle. A second annular series of screws 34 extend through both of the body portions 14 and 16 into tapped holes 35 provided in the end of the spindle 32 and hold the body 12 attached securely to the spindle. Manifestly, the screws 34 simply hold the chuck body 12 on the spindle 32. They are not required to sustain sidewise or lateral forces occurring in use as this function is served adequately by the pilot 30. The peripheral surfaces 36 and 38 of the front and rear body portions 14 and 16 extend flush with each other and the confronting inner radial surfaces 40 and 42 thereof are piloted together at 44 to hold the two body portions in proper alignment with each other and to relieve the screws 18 of forces occurring in use which otherwise might tend to shift one body portion laterally relative to the other. Both of the screws 18 and 34 preferably are countersunk in the face 46 of the front body portion 14 as at 48 and 50 according to conventional practice.

The particular chuck here shown by way of illustration is adapted to clamp the rim 54 of a workpiece such as the one shown at 56 on both the inner and outer surfaces 58 and 60 thereof. The rim 54 is annular in form and the inner rim surface 58 is adapted to be clampingly engaged by three equispaced inner work holding jaws 62, 64 and 66. The outer rim surface 60 is adapted to engaged by three equispaced outer work clamping jaws 68, 70 and 72. As perhaps best shown in FIG. 1, each of the inner jaws 62, 64, 66 is disposed in radial alignment with and opposite to a respective one of the outer jaws 68, 70, 72. Thus, the inner jaw 62 is radially aligned with and opposite the outer jaw 68, the inner jaw 64 is radially aligned with and opposite the outer jaw 70, and the inner jaw 66 is radially aligned with and opposite the outer jaw 72. Moreover, the three sets of jaws 62–68, 64–70 and 66–72 are spaced angularly equidistantly apart so as to engage the annular inner and outer surfaces 58 and 60 of the rim 54 at equally spaced places. Three end stops 74, 76 and 78 mounted on the face of the chuck body 12 between the three pairs of work-holding jaws and fastened thereto by screws 80 are adapted to seat forwardly against an inner annular surface 82 of the workpiece 56 to position the latter axially and initially for clamping engagement by the jaws.

Any suitable form of work-holding jaw can be used to clamp the workpiece 56; and, indeed, the particular form of jaw used in any particular instance depends on the size and shape of the workpiece to be clamped. For this reason each of the inner jaws 62, 64, 66 is detachably fastened by screws 84 and 86 to a jaw base 88. FIG. 2 shows only the jaw 64 mounted on its base 88, but it will be readily apparent that each of the other jaws 62 and 66 are similarly mounted. As shown, both the inner jaw 64 and the jaw base 88 lie primarily under the rim 54 of the workpiece 56, and the jaw 64 is provided at the inner end thereof with an axially outwardly or forwardly extending flange 90 which projects a short distance into the hollow interior of the workpiece with the outer face 92 thereof in confronting relation to and spaced from the inner surface 58 to be clamped. The face 92 preferably is arcuately curved to conform to the annular inner surface 58, and a pair of laterally spaced grips 94 are embedded in and project from the side 92 of the jaw for engagement with the workpiece. In conventional practice, the work engaging faces of the grips 94 preferably are serrated or otherwise roughened to provide an effective holding contact with the workpiece surface 56. As shown, the jaw 64 seats radially outwardly against the workpiece surface 58, and the jaw base 88 preferably is formed at the inner end thereof with a ledge 96 which overlies the inner end of the jaw 64 and relieves the fastening screws 84 and 86 of clamping pressure. As suggested, while only the one jaw 64 is shown in FIG. 2, it will be readily appreciated that all of the inner jaws 62, 64, 66 are identical in size and shape. They are all identically mounted on jaw bases similar to the one here shown at 88, and they all engage the inner annular surface 58 of the workpiece 56 in a like manner.

Similarly, the outer jaws 68, 70, 72 are all identical in size and shape and they are all identically mounted on jaw bases such as the one shown at 98 in FIG. 2. As in the case of the inner jaw 64, this figure shows only the one outer jaw 70 but it will be understood that all of the outer jaws 68, 70, 72 are mounted in the same manner as the one shown. More particularly, the jaw 70 is fastened by screws 100 and 102 to the jaw base 98, and the latter is formed at the outer end thereof with an axially outwardly extending ledge 104 which overlies the outer end of the jaw and relieves the screws 100 and 102 of strain under clamping pressure. Both the jaw 70 and its jaw base 98 are disposed entirely radially outwardly of the workpiece 56 and the inner end of the jaw 70 is suitably formed to accommodate and engage the peripheral surface 60 of the workpiece. In actual practice, the inner end 106 extends in opposed confronting relation to the workpiece surface 60, and a pair of grips 108 embedded in and projecting from the end 106 actually engages the workpiece 56. Here again, the grips 108 conventionally are serrated or otherwise roughened to assure a secure gripping contact with the workpiece.

With respect to both the inner jaws 62, 64, 66 and the outer jaws 68, 70, 72 it is contemplated that jaw mountings of the type shown in applicant's copending application Ser. No. 797,165 filed Feb. 6, 1969 are particularly suitable for the chuck of this invention, and the details of the jaw mounting disclosed in that application are incorporated by reference in this application. It is emphasized again, however, that the present invention is not limited to the particular jaw mounting shown in the application referred to above. Many different kinds of jaws and jaw mountings can be used with the chuck of this invention and it is contemplated that any suitable type of jaw and jaw mounting suitable for the particular situation and form of workpiece be used.

Each inner jaw base 88 is mounted on and preferably formed integrally with a rocker arm 110 that has a ball portion 112 immediately behind the base 88 which is pivotally retained in the face of the chuck body 12 by a fixed front swivel mounting 114. A sliding ball swivel 116 mounted on the rocker arm 110 behind the fixed swivel mounting 114 is carried by a front radial actuating member 118 that is connected indirectly to and actuated by a drawbar 120 which is mounted for reciprocation in the spindle 32 according to conventional practice. While only the jaw base 88 which carries the inner jaw 64 is shown in FIG. 1, it will be understood that the jaw bases of all three inner jaws 62, 64, 66 are similarly mounted on rocker arms 110, that all three rocker arms are identical and are identically contained in front swivel mountings 114 which are disposed concentrically around the axis of the chuck and in equispaced relation with respect to each other. Also, all three of the rocker arms 110 are similarly equipped with rear swivel mountings 116, and all three swivel mountings 116 are identically carried by and associated with the radial actuating member 118. In each instance, the portion of the rocker arm 110 behind the front ball portion 112 thereof is inclined angularly with respect to the axis of the chuck; and, as the radial actuating member 118 reciprocates with the drawbar 120, the rear swivel mounting 116 slides on the rocker arm 110 to rock or pivot the latter in the front swivel mounting 114. In the case of the inner rocker arms 110, the angle of inclination is rearwardly and outwardly with respect to the axis of the chuck so that retraction of the drawbar 120 pulls the rear swivel mountings 116 rearwardly on the rocker arms 110 thereby causing the latter to pivot counterclockwise, as viewed in FIG. 2, in the swivel mountings 114 so as to swing the jaws 62, 64, 66 laterally or radially outwardly into clamping engagement with the inner surface 58 of the workpiece 56. Contrariwise, when the drawbar 120 is advanced; viz, moved to the right as viewed in FIG. 2, the radial actuating member 118 advances with it causing the rear swivel mounting 116 to move forwardly on the rocker arms 110 so that the latter pivot in clockwise directions, as viewed in FIG. 2, and move the inner jaws 62, 64 and 66 radially inwardly to work releasing positions away from the surface 58 of the workpiece 56. This action is described in applicant's U.S. Pat. No. 3,069,181 which issued Dec. 18, 1962 and for a more detailed description of the mounting and operation of the jaw actuating mechanism, that patent is incorporated by reference herein. Also, if desired, the particular form of rocker arm shown and described in applicant's U.S. Pat. No. 3,472,526 which issued Oct. 14, 1969 can be used in the chuck of this invention, and the disclosure of this patent therefore also is incorporated by reference herein.

Each of the outer jaw bases 98 is similarly mounted on the preferably formed integrally with a rocker arm 122; and immediately behind the jaw base, the rocker arm is formed with an integral ball portion 124 which is retained for universal pivotal movement in a front swivel mounting 126 provided in the face of the chuck body 12. Slidably mounted on the portion of the rocker arm 122 extending rearwardly from the ball portion 124 is a rear swivel 128 which is carried by a second rear radial actuating member 130 also disposed in the chamber 62 and connected indirectly to and movable with the drawbar 120. While only one rocker arm 122 is shown in FIG. 2, it will be understood that each of the outer jaws 68, 70, 72 is similarly mounted on a rocker arm 122, that the three outer rocker arms are disposed concentrically around the axis of the chuck, and that they are angularly equispaced with respect to each other. Also, each of the rocker arms 122 is similarly mounted in a fixed swivel mounting 126 and each is similarly equipped with a sliding rear swivel 128 which is carried by the radial actuating member 130. All of the sliding swivels 128 for the outer rocker arms 122 are identically mounted in the actuator 130 as shown in the drawing and they are arranged concentrically around the axis of the chuck in angularly equispaced relation with respect to each other. The portions of the outer rocker arms 122 which extend rearwardly from the ball portions 124 are inclined angularly with respect to the axis of the chuck. However, the outer rocker arms 122 are inclined angularly rearwardly and inwardly so that retraction of the actuating member 130 by the drawbar 120 causes the rocker arms 122 to pivot clockwise as shown in FIG. 2 in the swivel mountings 126 so as to move the outer jaws 68, 70, 72 carried thereby radially inwardly into clamping engagement with the surface 60 of the workpiece 56. Contrariwise, when the drawbar 120 and the radial actuating member 130 are advanced, the rear sliding swivels 128 move forwardly on the rocker arms 122 to pivot the latter counterclockwise as viewed in FIG. 2 in the swivel mountings 126 thereby moving the outer jaws 68, 70, and 72 radially outwardly to work releasing positions. As in the case of the inner jaw assemblies, the outer jaw assemblies are mounted and actuated in the manner disclosed in detail in applicant's prior U.S. Pat. Nos. 3,069,181 and 3,472,526 referred to above and the disclosures of those two patents also are included by reference herein with respect to the outer jaw assemblies.

The position of each outer jaw 68, 70, and 72 opposite a respective one of the inner jaws 62, 64 and 66 causes the two jaws of each pair to pinch the rim 54 tightly therebetween when the drawbar 120 is retracted. The combined clamping force exerted by the two sets of jaws is exceedingly effective in holding the workpiece 56 securely in the chuck while a machining or other operation is performed thereon; and, this type of clamping action is particularly effective in holding a thin or flexible workpiece which otherwise would be distorted by a conventional jaw arrangement wherein the jaws act on the workpiece at only one side thereof.

It is frequently necessary or desirable in actual practice to hold a workpiece centered axially in the chuck; viz, with the center of the workpiece precisely coincident with the center or rotational axis of the chuck particularly with reference to a previously machined and finished surface of the workpiece. For example, it might be assumed for the purpose of this description that the inner annular surface 58 of the workpiece 56 had been finished in a previous machining operation and that it is necessary to hold the workpiece in the chuck with the surface 56 precisely concentric to the rotational axis of the chuck and to the spindle 32 so that some other surface of the workpiece such as the outer annular surface 132, for example, or perhaps the surface 134 can be machined so as to be also concentric to the center of the workpiece and to the previously finished surface 58. If it is assumed further that the workpiece 56 is a casting and that the annular surface 60 to be clamped by the outer set of jaws 68, 70, 72 as well as the surface or surfaces to be machined are rough and unfinished and therefore neither perfectly round nor exactly concentric to the finished surface 58, the nature of the problem will be apparent. Specifically, the situation described above requires that the inner and outer sets of jaws be operable to both clamped and unclamped positions in unison by a single actuator, that the inner set of jaws engage the machined inner surface 58 of the workpiece, that it adjust the workpiece laterally in the chuck as required to position and hold the surface 58 precisely centered with respect to the rotational axis of the chuck, that all of the inner work-holding jaws contact the surface 58 with the same holding force, that the outer set of jaws 68, 70, 72 engage the workpiece with clamping pressure after the inner set of jaws are set, that the outer jaws adjust to any out-of-roundness or eccentricity of the surface 60 engaged thereby, that all three outer jaws contact the surface 60 with the same clamping pressure, and preferably also that the clamping pressure exerted by all six jaws be equalized. The means for accomplishing these results resides not only in the manner in which the jaws are mounted in the chuck but also the manner in which the jaw actuators 118 and 130 are connected to and actuated by the drawbar 120; and this means is an important part of the present invention.

At this point, it should perhaps be emphasized however that, while the supposititious circumstance and requirements described above are typical and illustrate the purpose and utility of the chuck of this invention, these conditions are not necessarily limiting. A primary advantage of the chuck and of the jaw operating mechanisms comprising the invention is its versatility and adaptability to varying conditions. For example, by varying the shape of certain components of the jaw actuating mechanism and indeed in the arrangement of the jaws themselves, it is possible to have one set of jaws (either the inner set of jaws 62, 64, 66 or the outer set of jaws 68, 70, 72) contact and grip the workpiece 56 with greater pressure than the other set of jaws. This may be desirable under certain circumstances perhaps dictated by the workpiece itself where equalization of clamping pressure among both sets of work-holding jaws might result in undesirable distortion of or damage to the workpiece. Also, it is possible by modifying the jaw arrangement and particularly the shape and length of the rocker arms which carry the jaws or the mountings of the jaws on the body 12, that the inner jaws and the outer jaws engage the workpiece at axially spaced points in the manner of the chuck shown in applicant's prior U.S. Pat. No. 3,365,206 which issued Jan. 23, 1968. Also by a slight modification of the work-holding jaws and the jaw mountings, it is possible to have both sets of jaws contact inner surfaces of the workpiece or to have both sets of jaws contact outer surfaces of the workpiece at axially spaced points on the latter. In addition, it is possible to construct the jaw actuating mechanism so that both sets of jaws center the surfaces contacted thereby with respect to the rotational axis of the chuck. This might be desirable, for example, where the two sets of jaws engaged previously finished surfaces at opposite ends of a tubular workpiece, as shown in FIG. 8 of U.S. Pat. No. 3,365,206, and where it is desirable to bore or broach the inner wall of the workpiece precisely concentrically to the clamped outer surfaces. Not only is the chuck of this invention adaptable and versatile in the manner described above, but the jaw actuating mechanism of this invention which produces these results is mechanically simple and compact, whereby the size of the chuck can be held to a minimum so that the chuck itself can be used on machines having a relatively short swing or under conditions where space at the face of the spindle is otherwise limited and restricted.

More particularly, the jaw operating mechanism of this invention comprises means fastened to and forming an extension of the drawbar 120 disposed centrally of the chuck body 12 and extending axially through the chamber 24 thereof and through openings provided centrally in the two jaw actuators 118 and 130. The particular means here shown comprises a tubular member 136 disposed coaxially on the end of and fastened to the drawbar 120 by a screw 138. As shown, the head of the screw 138 is countersunk at the outer end of the tubular member 136 and the inner end of the latter is seated solidly against the end of the drawbar 120. As shown, the tubular member 136 may be and preferably is substantially smaller in diameter than the drawbar 120. A radially outwardly extending flange 140 on and at the outer end of the tubular member 136 is snugly but slidably journaled in an opening 142 provided centrally in the face of the chuck body 12.

Since the screw 138 fastens the tubular member 136 securely to the drawbar 120, the tubular member reciprocates with the drawbar; and, as it does so, the flange 140 slides back and forth in the opening 142. Since chucks of the type herein described are generally used in mass production operations involving a single part, the work clamping jaws are not required to move very far between clamping and unclamping positions. It is only necessary that the jaws have sufficient movement to compensate for tolerance variations in the size of the part and that it release the workpiece sufficiently in the unclamped position to permit one workpiece to be readily removed from the chuck and a new workpiece inserted. As a consequence, the stroke of the drawbar 120 can be correspondingly short; and, in practice, the flanged outer end of the tubular member 136 remains in and is guided by the opening 142 at all times. A cap 144 on the face of the chuck body 12 and fastened thereto by screws 146 covers the opening 142 and keeps dirt and other foreign matter out of the opening and away from the moving parts of the chuck.

A collar 148 surrounding and snugly fitting the inner end of the tubular member 136 and fastened thereto by one or more setscrews 150 seats against the end of the drawbar 120 and is journaled snugly but slidably in an opening 152 provided centrally in the bottom 20 of the chuck body 12. O-rings 154 and 156 mounted in the periphery of the flange 140 and in the annular wall of the opening 152 seal the front and rear openings 142 and 152 and assist in keeping dirt and other contaminants out of the interior of the chuck and away from the operating parts thereof. In this connection, an O-ring 158 also preferably is provided in the internal annular surface 160 of the collar 148 to seal the joint between the collar and the annular member 136. A countersink 162 in the forward end of the collar 148 defines a radial shoulder 164 which faces and is in confronting relation to the inner face 166 of the flange 140.

Figure 5:
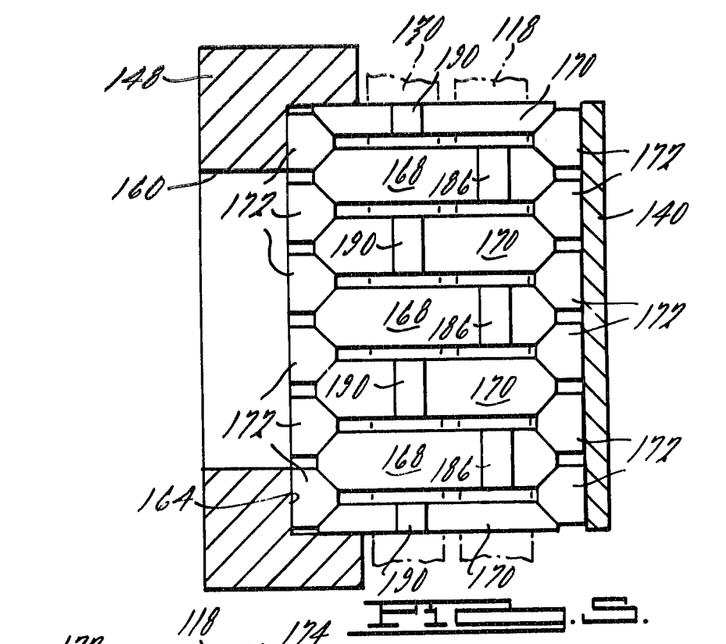
FIG. 5 is a developed view of the jaw actuator mechanism disclosed in FIG. 4 showing the actuator bars and associated wedge members disposed in a normal or neutral position.
Figure 6:
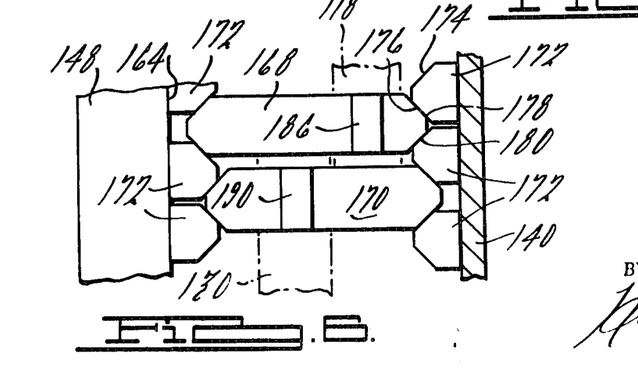
FIG. 6 is a fragmentary view similar to FIG. 5 but showing the actuator bars and associated wedge members in an extreme adjusted position.
Figure 7:
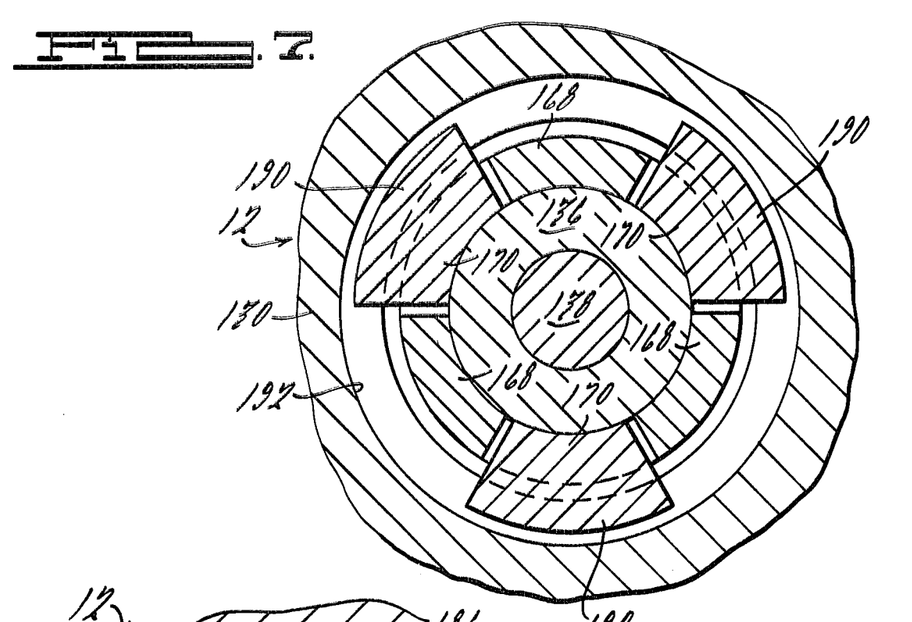
FIG. 7 is an enlarged, fragmentary, transverse sectional view taken on the line 7—7 of FIG. 2.
Figure 8:
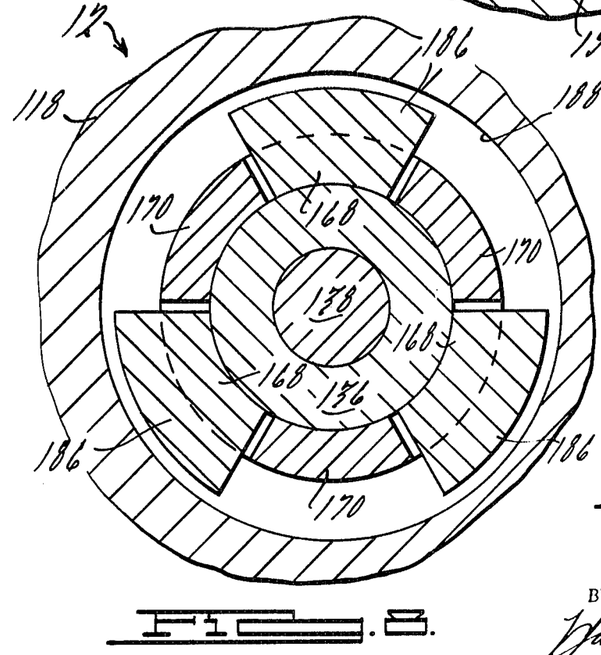
FIG. 8 is an enlarged, fragmentary, transverse sectional view taken on the line 8—8 of FIG. 2.

Surrounding and supported by the tubular member 136 are two sets of longitudinal actuator bars 168 and 170. There are three actuator bars 168, one for each of the inner jaws 62, 64, 66 and three actuator bars 170, one for each of the outer jaws 68, 70, 72; and the three actuator bars 168 are arranged alternately with respect to the three actuator bars 170. At both ends of the longitudinal actuator bars 168 and 170 and supporting the same axially or longitudinally are a plurality of wedge members 172. A wedge member 172 is provided between each adjacent pair of longitudinal actuator bars 168 and 170. The wedge members 172 at the outer ends of the longitudinal actuator bars 168 and 170 seat on the radial inner face 166 and the wedge members 172 at the inner ends of the actuator bars 168 and 170 seat on the radial shoulder 164. As its name implies, each wedge member 172 is formed at the inner end thereof with tapered surfaces 174 and 176 which engage correspondingly tapered surfaces 178 and 180 at the ends of each actuator bar 168 and 170. In the form of the invention here shown, and particularly in any situation where clamping pressure at all six jaws 62–72 is to be equal, the taper angle of the surfaces 174, 176, 178, 180 is 45°. Wedge members 172 hold the actuator bars 168 and 170 spaced uniformly apart entirely around the circumference of the tubular member 136; and the wedge members normally are spaced uniformly apart, as perhaps best shown in the developed view of FIG. 5. However, the wedge members are freely shiftable or adjustable circumferentially on the supporting surfaces 164 and 166 under wedging action exerted by the tapered ends of the actuator bars 168 to permit the two sets of bars to move longitudinally in opposite directions (FIG. 6) within limits on and relative to the tubular member 136. As also shown in FIG. 6 the actuator bars 168 and 170 can move longitudinally until adjacent pairs of wedge members 172 come together. It will be observed also (FIGS. 7 and 8) that the inner or back surfaces of the actuator bars 168 and 170 preferably are arcuately curved transversely on the same radius as the outer supporting surface of the tubular member 136 so that the actuator bars seat on and are supported by the tubular member over the entire rear surfaces thereof.

All six actuator bars 168 and 170 extend through central openings 182 and 184 provided in the radial actuating members 118 and 130; and, in the particular form of the invention here shown by way of illustration, the opening 182 fits the actuator bars relatively snugly whereas the opening 184 is oversized and consequently receives the actuator bars loosely with substantial radial clearance. Radially outwardly extending lugs 186 on the one set of actuator bars 168 extend into and are snugly received by an internal annular groove 188 in the actuating member 118; and radially outwardly extending lugs 190 on the other set of actuator bars 170 extend into and are snugly received by an internal annular groove 192 in the central opening 184 of the actuating member 130. Thus, all three of the actuating bars 168 are restrained by the groove 188 to move in unison longitudinally on the tubular member 136; and all three of the actuator bars 170 are similarly restrained by the groove 192 to move in unison on the tubular member 136. All of the wedge members 172 at the forward ends of the actuator bars 168 and 170 as well as the forward end portions of the actuator bars themselves are disposed within and confined by the front opening 142. Similarly, all of the wedge members 172 at the rear or inner ends of the actuator bars 168 and 170 as well as the inner or rearward end portions of the actuator bars are disposed within and confined by the annular, axially extending wall 194 of the countersink 162. Thus, while the wedge members 172 are free to shift circumferentially and the actuator bars 168 and 170 are free to shift longitudinally on and relative to the tubular member 136, all of these members are confined to the particular movements described. As suggested, however, while all three of the actuator bars 168 are constrained by the mechanically interfitting lugs 186 and groove 188 to move in unison, they are free to move in this manner only as permitted by circumferential shifting of the wedge members 172; and as the actuator bars move they carry the radial actuating member 118 with them. Further, as previously suggested, longitudinal movement of the member 118 causes the rear swivel mountings 116 to move on the rocker arms 110 whereby to pivot the latter angularly in the swivel mountings 114 and to produce a corresponding radial movement of the inner set of work engaging jaws 62, 64, 66. Similarly, the three actuator bars 170 are constrained by the interfitting lugs 190 and groove 192 to move in unison as permitted by the wedge members 172; but, as they move longitudinally on the tubular member 136, they cause a corresponding longitudinal movement of the radial actuating member 130; and this in turn causes the rear swivel mountings 128 to move on the rocker arms 122 which results in a corresponding angular pivotal movement of the rocker arms in the swivel mountings 126 and radial movement of the outer set of jaws 68, 70, 72.

In operation, the wedge members 172 normally are spaced relatively uniformly apart and all six actuator bars 168 and 170 normally are disposed uniformly in substantially equispaced relation between the radial seating surfaces 164 and 166 and these elements retain the relative positions described unless they are forced to change position in some manner as by clamping engagement of the work holding jaws with the workpiece 56. Thus, no adjusting movement of either the actuating bars 168 and 170 or of the wedge members 172 occurs during movement of the jaws to and from the workpiece 56. If the drawbar 120 is at the forward limit of its travel and the jaws 62–72 are fully open or in the fully unclamped position, no movement of the actuator bars 168 and 170 or of the wedge members 172 occurs as the drawbar 120 is retracted and the jaws 62–72 begin to move toward work clamping positions. Initial retractive movement of the drawbar 120 in the manner described simply moves the actuator bars 168 and 170 and wedge members 172 bodily rearwardly in the body 12 with the tubular member 136; and rearward movement of the actuator bars causes the radial actuating members 118 and 130 also to retract in the chuck body. These movements occur simultaneously and in unison; and, as this action takes place, the inner set of jaws 62, 64, 66 move radially outwardly toward the surface 58 of the workpiece 56 and the outer set of jaws 68, 70, 72 move radially inwardly toward the surface 60. This action progresses without effect other than that described until the inner set of jaws 62, 64, 66 engage and apply clamping pressure against the surface 58. As the inner jaws 62, 64 and 66 come up tight against the workpiece 56, the latter shifts laterally in the chuck as required to equalize clamping pressure between the three jaws 62, 64, 66. If the outer set of jaws should contact the workpiece first, they will not apply clamping pressure as the radial actuating member 130 simply moves radially or laterally relative to the central actuator mechanism. However, as soon as the inner set of jaws 62, 64, 66 clamp the workpiece 56, the radial actuating member 118 associated therewith is prevented from farther axial rearward movement in the chuck body 12. Continued retractive movement of the drawbar 120 causes the wedge members 172 to shift circumferentially on the radial surfaces 164 and 166 under force exerted by the longitudinal actuator bars 168 and 170 with the result that the three actuator bars 170 associated with the radial actuating member 130 continue to retract until the outer set of jaws 68, 70, 72 clampingly engage the workpiece surface 60; and if the surface 60 should be slightly out-of-round or eccentric to the inner surface 58, the radial actuating member 130 shifts or adjusts laterally relative to the actuator bars 168 and 170 to compensate for the out-of-roundness or eccentricity and to equalize clamping pressure among the three outer jaws 68, 70, 72. The drawbar 120 continues to retract until all six work holding jaws 62–72 engage the workpiece with equal pressure with the inner surface 58 held precisely concentric to the rotational axis of the chuck.

Figure 9:
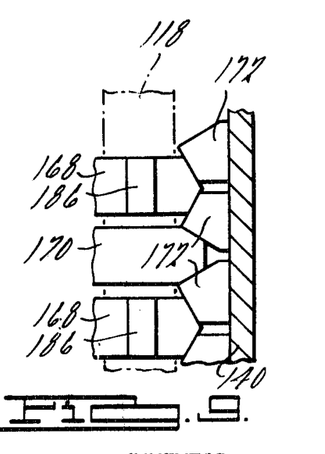
FIG. 9 is a fragmentary view similar to FIG. 6 but showing actuator bars and associated wedge members modified to provide one set of work-holding jaws with substantially greater clamping pressure than the other set of work-holding jaws.

From the foregoing, it will be readily appreciated that clamping pressure at all of the jaws 62–72 is equal because the angular surfaces 74, 76, 78, 80 between the longitudinal actuator bars 168 and 170 and the wedge members 172 are equal. Thus, clamping pressure exerted by the jaws 62–72 against the work 56 can be selectively distributed by varying the taper angles between the actuator bars 168 and 170 and the wedge members 172. For example, if the taper angles between the actuator bars 170 and the wedge members 172 are made relatively steep and the taper angles between the actuator bars 168 and the wedge members 172 are made relatively flat, as shown in FIG. 9, the outer set of jaws 68, 70, 72 grip the workpiece with less force than the inner jaws 62, 64, 66. Of course, as long as the taper angles between the actuator bars 168 and wedge members 172 are the same, all of the inner jaws 62, 64, 66 engage the workpiece 56 with equal pressure; and as long as the taper angles between the actuator bars 170 and the wedge members 172 are the same, all of the outer jaws 68, 70, 72 engage the workpiece with equal pressure. The wedge configuration shown in FIG. 9 simply causes the total force exerted against the workpiece 56 by the outer jaws 68, 70, 72 to be less than the total force exerted against the workpiece by the inner jaws 62, 64, 66.

As described, the inner jaws 62, 64, 66 centralize the inner surface 58 in the chuck because the radial actuating member 118 fits the actuator bars 168 and 170 relatively snugly and therefor is not free to shift laterally or radially on the central actuator assembly. On the other hand, the outer jaws 68, 70, 72 compensate for eccentricity or out-of-roundness of the outer surface 60 because the rear radial actuating member 130 fits the actuator bars 168 and 170 relatively loosely and therefor is able to shift or adjust laterally under clamping pressure at least within limits defined by the amount of clearance between the hole 184 and the central actuator assembly and the amount of lateral shifting movement permitted of the wedge members 172. From this it will be apparent also that both sets of jaws can be made to centralize the surfaces engaged thereby simply by making both of the radial actuating members 118 and 130 fit the actuator bars 168 and 170 essentially snugly in the manner of the actuating member 118 shown in FIG. 2. A modified structure in which both actuating members 118 and 130 fit the actuator bars 168 and 170 snugly in this manner is shown in FIG. 3. Of course, the modified form of the invention shown in FIG. 3 is desirable only where the surfaces engaged by both sets of jaws are precisely concentric or where the chuck is further modified to have the two sets of jaws engaged opposite ends of a workpiece or at least engage the workpiece at longitudinally spaced points. This particular mode of clamping a workpiece might be used for example, where a hole is to be drilled or bored or reamed in the workpiece precisely on the center of the chuck and centrally with respect to the gripped or clamped surfaces.

In this latter connection, it will be apparent that the chuck can be modified to engage a workpiece at longitudinally spaced points simply by extending or lengthening the portions of the rocker arms of one set of jaws between the jaw bases and the front swivel mountings or by modifying the front body portion 14 to set the swivel mountings of one set of jaws farther forward. For example, the outer jaws 68, 70, 72 can be made to engage the front outer surface 132 simply by extending the portions of the rocker arms 122 between the jaw bases 98 and the swivel mountings 126 or alternatively by modifying and lengthening the jaws themselves; and, if the rear radial actuating member 130 were made to fit the actuator bars 168 and 170 snugly as shown in FIG. 3, both of the surfaces 58 and 132 would be centralized with respect to the rotational axis of the chuck. Of course, a more normal work situation of this type would be to have the two sets of jaws engage a relatively elongate tubular member for example at or adjacent to the opposite ends thereof. In this event, if the inner jaws 62, 64, 66 engage the rearward end of the workpiece internally, as shown in FIG. 2, it would be necessary to elongate the rocker arms 122 considerably more than in the example previously given. However, the rocker arms can be elongated in this manner to a very considerable extent without adversely effecting or in any way interfering with the operation of the chuck.

Also, the chuck construction of this invention can be easily modified to make all of the work clamping jaws engage the workpiece internally or to make all of the work clamping jaws engage the workpiece externally. For example, if the outer rocker arms 122 were rotated 180° in the front swivel mountings 124 so that the rearwardly extending portions of the rocker arms incline angularly rearwardly and outwardly in the same manner as the inner rocker arms 110 and if the rear radial actuating member 130 and perhaps the chuck body 12 also were modified to accommodate the repositioned outer rocker arms 122, all six of the jaws 62–72 would swing outwardly when the drawbar 120 is retracted. Of course, this modified form of chuck would be useful inly where the shape of the workpiece required the clamping action described. On the other hand, it would be simple matter to modify the chuck further by mounting all six work clamping jaws 62–72 and their associated rocker arms 110 and 122 concentrically on the same radius as disclosed in U.S. Pat. No. 3,365,206 hereinabove referred to. This, of course would require a modification in the shape and arrangement of the two radial actuating members 118 and 130 and in the shape of the chamber 52 but this could be easily done and it would also permit the use of a relatively smaller diameter chuck housing 12. With this modified construction, all six work holding jaws 62–72 would clamp the workpiece internally; and, if one set of rocker arms were elongated in the manner hereinabove described, the two sets of jaws could be made to clamp the workpiece internally at axially spaced points. On the other hand, if the inner rocker arms 110 were rotated 180° in the front swivel mountings 114 and the forward radial actuating member 118 were suitably modified to accommodate the repositioned rocker arms, both sets of jaws would engage and clamp the workpiece externally. Further, if one set of rocker arms 122 were elongate, the two sets of jaws would clamp the workpiece externally at axially spaced points, as shown in FIG. 8 for example in U.S. Pat. No. 3,365,206.

Manifestly, the versatility and adaptability of the chuck disclosed herein is an important feature of the invention. Many of these modifications can be made in an existing chuck structure. Relatively little cost is involved in adapting the operation of the chuck to a different kind or form of workpiece and the necessary modifications can be made at much lower cost than a new chuck. For example, to change the chuck shown in FIG. 2 from one which centralizes and compensates to one of the type shown in FIG. 3 which centralizes both of the clamped surfaces, it is merely necessary to substitute for the rear radial actuating member 130 of FIG. 2 one of the type shown in FIG. 3.

I claim:
1. A chuck of the type having a body, two sets of work-holding jaws having longitudinal rocker arms, front swivel mountings connecting said rocker arms for pivotal rocking movement on said body, a reciprocable actuator, and means for translating movement of said actuator into pivotal movement of said rocker arms and consequential radial clamping and unclamping movement of said work-holding jaws, said means including
    two sets of longitudinal actuator bars
        one for each of said jaws;
    a plurality of wedge members
        at and supporting the ends of said actuator bars, said actuator bars being normally spaced from each other and said wedge members being normally spaced from each other around the circumference of said actuator,
        said actuator bars and said wedge members being arranged alternatively with respect to each other and having correspondingly tapered, mutually engaged seating surfaces,
        said actuator bars being mounted for limited longitudinal movement on said actuator and relative to said wedge members, and
        said wedge members being mounted for limited circumferential movement on said actuator and relative to each other accommodate longitudinal movement of said actuator bars;
    a pair of radial actuating members one connected to and movable longitudinally with one set of actuator bars and the other connected to and movable longitudinally with the other set of actuator bars; and rear swivel mountings
slidable on said rocker arms connecting said one set of rocker arms to one of said radial actuating members and connecting the other set of rocker arms to the other of said radial actuating members,
said radial actuating members, actuator bars, wedge members and rear swivel mountings being movable bodily with said actuator to pivot said rocker arms on said front swivel mountings and to move said work-holding jaws radially relative to a workpiece, one set of actuating bars and the radial actuating member associated therewith adapted to move longitudinally on said actuator independently of the other set of actuator bars and the other of said radial actuating member within limits permitted by said wedge members, whereby one set of work-holding jaws continues to move toward clamping engagement with a workpiece after the other set of work-holding jaws has clamped the workpiece.

2. A chuck of the type defined by claim 1 wherein said actuator is formed with
a cylindrical surface
behind and slidably supporting said longitudinal actuator bars and
longitudinally spaced, opposed, annular, radial surfaces
at opposite ends of said cylindrical surface seating and slidably supporting said wedge members.

3. A chuck of the type defined by claim 1 wherein the tapered seating surfaces of said actuator bars and said wedge members are all disposed at substantially the same angle with respect to the longitudinal center lines of said actuator bars and said wedge members.

4. The combination as set forth in claim 1 wherein the tapered seating surfaces of one set of actuator bars and of the wedge members engaged thereby are all disposed at substantially the same angle with respect to the longitudinal center lines of said actuator bars, wherein the tapered seating surfaces of the other set of actuator bars and of the wedge members engaged thereby are all disposed at substantially the same angle with respect to the longitudinal center lines of said other actuator bars, and
wherein the taper angle of the seating surfaces of said one set of actuator bars is different than the taper angle of the seating surfaces of the other set of actuator bars.

5. The combination as set forth in claim 1 wherein said radial actuating members are spaced longitudinally apart and are formed with openings which receive and surround said actuators bars, one of said radial actuating members being disposed adjacent one end of said actuator bars and mechanically interconnected to one set of said actuator bars, the other of said radial actuating members being disposed adjacent the other end of said actuator bars and mechanically interconnected to the other set of said actuator bars.

6. The combination as set forth in claim 1 wherein said radial actuating members are spaced longitudinally apart and are formed with openings which receive and surround said actuator bars,
one set of actuator bars being formed with radially outwardly extending lugs adjacent one end of said actuator bars and said lugs extending into and interfitting with an annular groove in one of said actuating members, the other set of actuator bars being formed with radially outwardly extending lugs adjacent the opposite ends of said actuator bars and said last-mentioned lugs extending into and interfitting with an annular groove in the other of said radial actuating members.

7. A chuck of the type defined in claim 5 wherein the openings in said radial actuating members surround and snugly fit all of said longitudinal actuator bars.

8. A chuck of the type defined by claim 5 wherein the opening in one of said radial actuating members surrounds and snugly fits said longitudinal actuator bars, and the opening in the other of said radial actuating members loosely receives and is spaced radially from said longitudinal actuator bars.

9. A chuck of the type defined by claim 1 wherein all of said work-holding jaws are disposed in a common radial plane in front of said body with one set of jaws spaced radially from the other set of jaws,
wherein the rocker arm portions of one set of jaws extend angularly rearwardly and outwardly from the front swivel mountings associated therewith, and wherein the rocker arm portions of the other set of work-holding jaws are inclined angularly rearwardly and inwardly from the front swivel mountings with which they are associated.

10. A chuck of the type defined by claim 1 wherein all of said work-holding jaws are disposed in substantially the same radial plane in front of said body, one set of jaws comprising an outer set of jaws and the other set of jaws comprising an inner set of jaws, each jaw of one set being disposed opposite a corresponding jaw of the other set,
the rocker arms of the inner set of jaws extending angularly rearwardly and outwardly from the front swivel mountings associated therewith and the rocker arms of the outer set of jaws extending angularly rearwardly and inwardly from the front swivel mounting associated with them,
whereby movement of said actuator in one direction pivots said two sets of rocker arms in opposite directions and moves the work-holding jaws on said rocker arms radially toward each other to clamp a workpiece disposed therebetween with a pinch action.

11. In a work-holding chuck of the type having a plurality of work-holding jaws provided with axially angularly inclined rocker arm portions carried by swivel mountings and pivotable in said mountings to clamp and release said jaws, the combination of
means for actuating said rocker arms including
a reciprocable actuator,
a plurality of longitudinally shiftable actuator bars,
one for each of said jaws,
circumferentially adjustable wedge members
at and seating against the ends of said actuator bars, and
means operatively connecting each actuator bar with the rocker arm portion of its respective work-holding jaw,
whereby movement of the actuator in one direction pivots said rocker arms to move the jaws into clamping engagement with a workpiece,
said actuator bars and said wedge members adapted to shift and adjust automatically on said actuator under clamping pressure of said jaws to permit all of said jaws to seat solidly on the workpiece.

12. A work-holding chuck including
two sets of opposed work holding jaws
having oppositely angularly axially inclined rocker arm portions;
swivel mountings
carrying said rocker arm portions and supporting the same for pivotal movement; and
means for actuating said rocker arm portions to clamp and release said jaws including
a reciprocable actuator,
two sets of longitudinally shiftable actuator bars
carried by said actuator and associated with respective sets of work-holding jaws,
circumferentially adjustable wedge members also carried by said actuator and seating the ends of said actuator bars, and
means operatively connecting each set of said actuator bars with the rocker arm portions of its respective set of work holding jaws,
whereby movement of said actuator in one direction pivots the rocker arm portions of said two sets of work-holding jaws in opposite directions to move said sets of jaws in opposition to each other to engage a workpiece with a pinch action, said actuator bars and said wedge members adapted to shift and to adjust automatically on said actuator to permit all of said work-holding jaws to engage and seat solidly on said workpiece.

13. The combination as set forth in claim 12 wherein all of said actuator bars are arranged in series around and concentrically to said actuator, and wherein said means operatively connecting the sets of actuator bars to the rocker arm portions of their respective sets of work-holding jaws includes a pair of radial actuating members coactive with respective sets of actuator bars and with the rocker arm portions of respective sets of work holding jaws, at least one of said actuating members surrounding and snugly fitting said actuator bars and operative to actuate its respective set of rocker arm portions and the work holding jaws associated therewith in unison and to hold said jaws precisely concentric to the axis of said chuck.

14. The combination as set forth in claim 13 wherein at least one of said actuating members surrounds and is adjustable radially relative to said actuator bars and is operable under clamping pressure to permit the set of work-holding jaws associated therewith to seat solidly on a surface of the workpiece which is eccentric or out-of-round with respect to the surface engaged by said other set of jaws.

15. In a work-holding chuck of the type having a plurality of work-holding jaws provided with axially angularly inclined rocker arm portions carried by swivel mountings and pivotable in said mountings to clamp and release said jaws, the combination of means for actuating said rocker arms including a reciprocable actuator, a plurality of longitudinally shiftable actuator bars, circumferentially adjustable wedge members at and seating against the ends of said actuator bars, and means operatively connecting said actuator bars with the rocker arm portions of said work-holding jaws, whereby movement of the actuator in one direction pivots said rocker arms to move the jaws into clamping engagement with a workpiece, said actuator bars and said wedge members adapted to shift and adjust automatically on said actuator under clamping pressure of said jaws to permit all of said jaws to seat solidly on the workpiece.

16. A work-holding chuck including two sets of work-holding jaws having angularly axially inclined rocker arm portions;

swivel mountings carrying said rocker arm portions and supporting the same for pivotal movement; and means for actuating said rocker arm portions to clamp and release said jaws including a reciprocable actuator, two sets of longitudinally shiftable actuator bars carried by said actuator and associated with respective sets of work-holding jaws, circumferentially adjustable wedge members also carried by said actuator and seating the ends of said actuator bars, and means operatively connecting each set of said actuator bars with the rocker arm portions of its respective set of work-holding jaws, whereby movement of said actuator in one direction pivots the rocker arm portions of said two sets of work-holding jaws to move said sets of jaws to engage a workpiece, said actuator bars and said wedge members adapted to shift and to adjust automatically on said actuator to permit all of said work-holding jaws to engage and seat solidly on said workpiece.